United States Patent [19]

Füssmann et al.

[11] Patent Number: 5,074,886

[45] Date of Patent: Dec. 24, 1991

[54] DYEING OR PRINTING OF ACID-TREATED GLASS FIBERS WITH ANIONIC DYE AND CATIONIC COMPOUND

[75] Inventors: Klaus Füssmann, Thurnau; Manfred Schnabel, Mainleus; Ulrich Schmidt, Bayreuth, all of Fed. Rep. of Germany; Hans H. Bosshard, Allschwil, Switzerland; Manfred Herrmann, Steinbach; Othmar Frank, Kirftel, both of Fed. Rep. of Germany

[73] Assignees: Ciba-Geigy Corporation, Ardsley, N.Y.; Frenzelit-Werke GmbH & Co., Fed. Rep. of Germany

[21] Appl. No.: 543,252

[22] Filed: Jun. 25, 1990

[30] Foreign Application Priority Data

Jun. 27, 1989 [DE] Fed. Rep. of Germany ....... 3921039

[51] Int. Cl.⁵ ............... D06P 3/80; D06P 1/39; C03C 25/02
[52] U.S. Cl. .............................. 8/523; 8/543; 8/568; 8/602; 8/606; 8/680; 8/685; 8/930
[58] Field of Search ............................. 8/523, 680

[56] References Cited

U.S. PATENT DOCUMENTS

| | | | |
|---|---|---|---|
| 2,462,428 | 2/1949 | Roesti | 8/523 |
| 2,582,919 | 1/1952 | Biefeld | 8/523 |
| 3,617,162 | 11/1971 | June et al. | 8/523 |
| 3,847,655 | 11/1974 | Crimmel et al. | 428/262 |
| 3,970,422 | 7/1976 | Maeda et al. | 8/523 |
| 4,009,314 | 2/1977 | Allewelt | 428/290 |
| 4,162,348 | 7/1979 | Juzu et al. | 428/416 |
| 4,426,205 | 1/1984 | Bann et al. | 8/523 |
| 4,543,103 | 9/1985 | Troesch | 8/523 |
| 4,764,175 | 8/1988 | Dore et al. | 8/437 |
| 4,767,421 | 8/1988 | van der Veen et al. | 8/523 |

FOREIGN PATENT DOCUMENTS

| | | |
|---|---|---|
| 818746 | 12/1974 | Belgium . |
| 0301555 | 2/1989 | European Pat. Off. . |
| 51-053077 | 5/1976 | Japan . |
| 52-049380 | 4/1977 | Japan . |
| 1550661 | 8/1979 | United Kingdom . |
| 2138032 | 10/1984 | United Kingdom . |

OTHER PUBLICATIONS

H. Zollinger, "Color Chemistry", (VCH), 1987, pp. 186-190.

*Primary Examiner*—A. Lionel Clingman
*Attorney, Agent, or Firm*—Kevin T. Mansfield; Edward McC. Roberts

[57] ABSTRACT

Process for dyeing or printing glass fibers, in particular textile glass fibers in various forms, by dyeing or printing the fiber materials with anionic dyes in the presence of cationic compounds following an acid pretreatment. The cationic compounds may be applied to the fiber material before the actual dyeing or printing process or else be applied together with the dye from the same dyeing liquor or printing paste. Suitable cationic compounds are in particular polyquaternized ammonium compounds. Level dyeings are obtained on the glass fiber materials with good light fastness properties.

22 Claims, No Drawings

DYEING OR PRINTING OF ACID-TREATED GLASS FIBERS WITH ANIONIC DYE AND CATIONIC COMPOUND

The present invention relates to a process for the light-fast dyeing or printing of glass fibers.

There are numerous existing processes and proposals for dyeing glass fibers. In the past they were usually dyed with pigment dyes in the presence of suitable binders, since glass fibers themselves, after all, do not have sufficient affinity for dyes.

The glass fibers thus dyed, and the textile fiber materials produced therefrom, have the disadvantage, inter alia, that they may turn black on heating, with or without the evolution of toxic gases. Their use as non-flammable furnishings or else in the form of glass fiber mats in building protection is therefore no longer possible.

There is therefore a need for glass fibers which are dyeable without the addition of organic binders.

For this reason there have already been attempts to dye glass fibers directly, i.e. without the addition of organic binders. For instance, U.S. Pat. No. 2,582,919 describes a process whereby the glass fibers are subjected to an acid treatment to extract up to 25% of their original weight in order to form negatively charged pores in their surface, thereby making it possible for positively charged dye ions, such as those of basic dyes, to go directly onto the glass fibers. However, such fibers are weakened to such an extent by the extraction that, in general, they are no longer further processible on the textile machines customary in glass fiber technology. This is also true of the similar procedure described in FR-A-1 420 107.

According to JP-A-76/53077, glass fibers are pretreated with acid salts, such as sodium bisulfite, or sulfamic acid, sulfanilic acid, aminonaphthalenesulfonic acid or p-toluenesulfonic acid and then dyed hot with basic dyes, for example C.I. Basic Red 17.

DE-C-738 145 describes the treatment of glass fibers with hydrofluoric acid or alkali metal fluorides and acids, these acids being further inorganic or organic acids. Fiber thus treated is then treated—without first being rinsed—with an alkali metal hydroxide, and a film of colloidal silica forms on the fiber. This is followed by dyeing with a basic dye, but it is still necessary to add mordants, for example thiodiphenols, tannins or antimony or iron salts, in the course of the pretreatment.

U.S. Pat. No. 3,617,162 finally discloses treating glass fibers with an aqueous solution of chromic acid, washing, and dyeing with cationic or basic dyes or with mordant dyes.

However, all these fiber materials thus dyed have the disadvantage that they are not sufficiently light-fast for decorative purposes, independently of the reduced strength due to the acid treatment.

A distinct improvement of these disadvantages is shown by the process of DE-C-3 725 505, whereby glass fibers, or textile fiber materials produced therefrom, are likewise subjected to an acid treatment, but only to a degree of extraction of at most 2%, and are then dyed directly or after an intermediate drying stage with basic acrylic dyes having a K value of $\leq 3.5$ at a liquor ratio of 4:1 to 15:1 and at a temperature of about 15° C. to 130° C. in a pH range of from 0 to 3 in the presence or absence of wetting agents and complexing agents. Dyeing is followed by the usual rinse, optional neutralization and subsequent aftertreatment. In a version of the process, the dyeing is applied to a previously acid-treated and dried material, which may also have been stored in the dry state, at a pH which corresponds to an aqueous acetic acid of 0.5 to 2 g/l. It is true that fiber materials so dyed have better light fastness properties, but are still not sufficiently light-fast for decorative purposes. For instance, even an aftertreatment with light stabilizers only reaches light fastness rating of about 1 to 3. Textile furnishing fabrics, however, should ideally have a light fastness rating of about 5 to 6.

It is therefore an object of the present invention to provide a process for dyeing or printing glass fibers which leads to dyed/printed glass fiber materials which are notable in particular for a distinctly improved light fastness.

It has now been found that the stated object is achieved by the present invention in making it possible to obtain dyeings or prints of excellent light fastness on glass fibers by dyeing or printing the glass fibers, or the textile fiber materials produced therefrom, with anionic dyes in the presence of cationic compounds.

The present invention accordingly provides a process for dyeing or printing sized or desized glass fibers which have been subjected to an acid treatment and thereafter possibly dried and/or stored, which comprises dyeing or printing the glass fibers with anionic dyes in the presence of cationic compounds.

The acid treatment can be carried out with customary mineral acids, such as concentrated hydrochloric acid or in particular nitric acid, at 20° to 100° C. in the course of 1 to 60 minutes. As a rule, the acid treatment is carried out up to a degree of extraction of at most 2% by weight.

Anionic dyes for the purposes of the present invention are dyes which contain anionic groups, e.g. $-SO_3^{\ominus}$ or $-COO^{\ominus}$, or groups which are convertible into anionic groups. These dyes are for example the familiar direct, acid, metal complex, reactive or else vat dyes as described for example in the Colour Index, published by the Society of Dyers and Colourists. Preferred are the direct, acid and metal-complex dyes.

The cationic compounds are essentially nitrogen-containing compounds which contain or can form cationic groups and which are known to the person skilled in the art for example as textile assistants in the form of, inter alia, levelling agents, retarders, fixing agents or else softening agents.

It is also possible to use low molecular weight, oligomeric or else polymeric cationic compounds, which may be present for example as salts of primary, secondary or tertiary amines, in particular as quaternized ammonium compounds.

Depending on the number of cationic nitrogen atoms present in the compounds, the compounds are monoammonium or polyammonium salts or (mono)quaternized or polyquaternized ammonium salts.

Increasing the number of quaternized groups while keeping the number of, for example, fatty alkyl radicals the same increases the affinity of the compounds for fiber and dye.

Examples of suitable cationic compounds are: primary, secondary or tertiary $C_8$–$C_{18}$ fatty amines in salt form (acetates) or quaternized with customary quaternizing agents, such as dimethyl sulfate, epichlorohydrin or benzyl chloride; polyethyleneimine resins within the molecular weight range from about 100,000 to 600,000; condensation products of polyethyleneimines and $C_{12}$–$C_{18}$ fatty acids; condensation products of polyethylene and polyamines; urea- or melamine-formaldehyde condensation products; condensation products of urea derivatives and ethanolamine; condensation products of $C_{12}$–$C_{18}$ fatty acids and polyamines (diethylenediamine, ethylenediamine, diethylenetriamine) in salt form or quaternized with customary quaternizing agents, e.g. oleyldiethylethylenediamine as halide or acetate; condensation products of (polymeric) polyamines and epichlorohydrin; pyridinium or imidazolinium salts, for example (poly)quaternized pyridine (e.g. cetylpyridinium chloride) or imidazoline derivatives; and also quaternized piperidine and polypiperidine derivatives.

The dyeing process according to the present invention can be carried out in one or two baths; that is, the cationic substances can be added to the dyeing liquor or the fiber is first treated with the cationic substance and then, possibly after an intermediate rinse and possibly after intermediate drying or intermediate storage, introduced into the dyeing liquor. The process works with and without intermediate drying or intermediate storage of the glass fibers following the acid pretreatment.

The dyeing process according to the present invention can be carried out batchwise but also continuously.

In the batchwise process, the dyeing and the acid pretreatment are both preferably carried out in customary high temperature (HT) apparatus with maintaenance of a temperature range, both the dyeing and the acid pretreatment preferably being carried out in aqueous liquor which is heated continuously from room temperature (about 15° to 20° C.) in the course of about 15 to 60 minutes to temperatures of 50° C. to just below the boiling point (less than 100° C.), maintained at that temperature for 30 to 120 minutes and then cooled back down to temperatures within the range from 50° C. to room temperature in the course of 15 to 60 minutes. The treatment with the cationic compound, if it is carried out before the dyeing, can take place at room temperature or else at elevated temperature (15° to 80° C.).

Not only the temperature profile of the dyeing process differs greatly from that employed in conventional textile dyeing, but both the treatments with the cationic compound and the dyeing are in general carried out with a somewhat different liquor ratio than is customary in textile dyeing. Whereas in customary textile dyeing the liquor ratio is about 10:1 to 40:1, the liquor ratio for the treatment with the cationic compound and in particular for the dyeing of the glass fibers should be less and be about 4:1 to 15:1, preferably about 5:1. This liquor ratio also depends on the density of the glass fiber material; the higher the density, the smaller the liquor ratio chosen. Smaller liquor ratios are not only more economical but also less damaging to the environment, since less wastewater is produced.

If the dyeing process according to the present invention is carried out continuously, the acid-pretreated glass fibers can be impregnated for example with a solution of the cationic compounds (on a padder), squeezed off to a certain weight increase, optionally dried, then impregnated with the dye solution, squeezed off and optionally dried before the dye is fixed on the fiber, for example by cold storage (as in the pad-batch process: about 8 to 24 hours at room temperature, 20° to 30° C.), steaming (as in the pad-steam process: about 1 to 20 minutes at about 100° to 130° C.) or thermofixing (pad-thermofix/Thermosol process: about 1 to 20 minutes at about 100° to 230° C.).

If desired, it is also possible to employ just one bath here; that is, the glass fibers are impregnated with the solution which contains the cationic compound and the dye.

It is further possible to include the acid pretreatment in the continuous process.

Instead of by impregnation on a padder the cationic compounds can also be applied to the acid-pretreated glass fibers by printing.

Instead of by dyeing the acid-pretreated glass fibers which are coated with a cationic resin can be printed with corresponding printing preparation (printing pastes) in known manner.

The cationic compounds can be brought onto the glass fibers from a separate liquor before the actual printing process, wherein the glass fibers may have been first dried and/or stored after the acid treatment.

Alternatively, the glass fibers may be (pre)treated simultaneously with the acid and the cationic compounds in a separate liquor and may then—optionally after they have been dried and/or stored—be printed with a printing paste.

Finally, one may print the glass fibers which have been optionally dried and/or stored after the acid treatment with printing pastes which contain the anionic dyes and also the cationic compounds.

After the dyeing process has ended, the dyed fiber material may be subjected to the usual rinse, neutralization and aftertreatment, for example by forming a finish or coating, in particular a water vapourtight coating, on the fiber material.

To this end, for example crosslinkable or polymerizable polymers or prepolymers are applied to the fiber material and, as the case may be, crosslinked or cured. The watertight coating formed should ensure in particular that a residual water content of 2 to 5% by weight remains in the fibers.

The dyeings and prints are reproducible, which applies not only to the use of individual dyes but also to dye mixtures. It is possible to produce level dyeings or prints in light, medium and dark shades which are very light-fast.

The glass fibers used in the dyeing process according to the present invention are in particular textile glass fibers which can exist in various forms, for example as loose fiber, yarn, woven fabric, knitted fabric or nonwoven fabric. If there is a size or some other finish on the fiber material to be dyed, it is advisable to desize or wash the material before the dyeing process.

The Examples which follow illustrate the invention. Parts and percentages are by weight, unless otherwise stated. The temperatures are given in degrees Celsius.

EXAMPLE 1

Pretreatment: Glass yarn is pretreated in an HT dyeing machine (capacity 18 l) with liquor containing 10 g/l of nitric acid (52/53%) and 1 g/l of a nonionic alkylpolyglycol ether (Perenin GNS). The liquor ratio is 5:1. The liquor is heated from 40° C. to 80° C. in the course of 20 minutes, then held at 80° C. for 40 minutes and finally slowly cooled back down to 50° C. The yarn is then rinsed, neutralized with aqueous ammonium hydroxide solution (pH 8) and dried at 110° C.

Following this treatment the glass yarn has a negative charge. Its further refinement comprises treating it with cationic compounds before (in the case of a two-bath procedure) or during dyeing (in the case of a one-bath procedure).

It is particularly remarkable that, following pretreatment with an acid, the yarn is storable without losing its affinity for cationic dyes or for cationic compounds in general. The acid pretreatment on the one hand and the treatment with the cationic compounds and/or dyes on the other thus need not be carried out immediately in succession. On the other hand, it is also possible to carry out the treatment with the cationic compounds and the dyeing separately. The glass fibers treated with the cationic compounds remain dyeable with anionic dyes for a prolonged period.

EXAMPLE 2

Glass yarn is subjected to an acid treatment in an aqueous liquor (dyeing machine as in Example 1); the cationic compound is present in the same liquor, which contains 12 g/l of nitric acid (52/53%), 1 g/l of a nonionic alkylpolyglycol ether and 5 g/l of a high molecular weight polyethyleneimine resin (MW 100,000–600,000) or of a resin formed from polyethylene and polyamine. The process sequence and the rinsing, neutralizing and drying are carried out as in Example 1.

Following this treatment the glass yarn has a high affinity for anionic dyes. The yarn is storable. This single-bath and single-stage process is particularly economical especially for pale dyeings.

EXAMPLE 3

The glass yarn pretreated as described in Example 1 is dyed in a liquor which contains 5 g/l of a high molecular weight polyethyleneimine resin (MW 100,000–600,000) or of a resin formed from polyethylene and polyamine, 1% of a mixture of tallow fatty amine/ethylene oxide adducts which have been esterified with sulfuric acid or quaternized with dimethyl sulfate, 0.2% of a dye mixture of C.I. Acid Orange 94 and C.I. Acid Orange 154, and 0.3% of a dye mixture of C.I. Acid Yellow 220 and C.I. Acid Yellow 129 (laboratory dyeing machine AHIBA Turbocolor, capacity 1 l, liquor ratio 5:1). To this end the liquor is heated from 50° C. to 95° C. in the course of 20 minutes, left at that temperature for 30 minutes and then slowly cooled back down to 50° C.

The dyed yarn is rinsed, and aftertreated in a liquor which contains 10 g/l of Pretavyl 9179 spec. The yarn is then dewatered and dried at 130° C.

The dyeing on the glass yarn has a yellow shade and is light-fast.

EXAMPLE 4

The glass yarn pretreated as described in Example 2 is dyed in a liquor which contains 0.5% of a mixture of tallow fatty amine/ethylene oxide adducts which have been esterified with sulfuric acid or quaternized with dimethyl sulfate, 1.0% of acetic acid (60%), 0.6% of C.I. Acid Yellow 220 (C.I. 11714), 0.3% of C.I. Acid Red 251 and 0.3% of Acid Black 60 (laboratory dyeing machine AHIBA Turbocolor, capacity 1 l, liquor ratio 5:1). To this end the liquor is slowly heated to 60° C., left at that temperature for 60 minutes and then cooled back down to 50° C.

The rinsing, aftertreating and drying are carried out as described in Example 3.

The dyeing on the glass yarn has a grey shade and is light-fast.

EXAMPLE 5

The glass yarn pretreated as described in Example 1 is cationized at 80° C. in a liquor which contains 5 g/l of a resin formed from polyethylene and polyamine and has a pH of 7. After a short intermediate rinse, the yarn is impregnated at room temperature with a liquor which contains 30 g/l of dye C.I. Acid Yellow 220 and 2 g/l of a mixture of tallow fatty amine/ethylene oxide adducts which have been esterified with sulfuric acid or quaternized with dimethyl sulfate.

The impregnated glass yarn is squeezed off to a weight increase of 30%, dried at 70° to 100° C. and then steamed at 100° C. for 10 minutes or thermofixed at 150° C. for 5 minutes. The yarn is then rinsed with cold water and finished. To this end, the glass yarn is padded with an aqueous liquor which contains 50 g/l of a dispersion of a self-crosslinking acrylate copolymer and 15 g/l of an emulsion of a modified polysiloxane on a padder to a weight increase of 50% and then dried at 105° C.

The yellow dyeing obtained on the glass yarn has good light, rub and wet fastness properties.

EXAMPLE 6

Packages with pretreated glass yarn (see Example 1) are treated at room temperature in an HT dyeing machine for 10 minutes with an aqueous liquor containing 0.2 g/l of a condensation product of p-tert-octylphenol and 8 moles of ethylene oxide at a liquor ratio of 1:13. Then two 2.5 g/l lots of a cationic polypiperidine derivative are added at room temperature 10 minutes apart, the packages are treated in the same liquor at the same temperature for a further 10 minutes, the liquor is then heated to 80° C. in the course of 40 minutes and held at that temperature for 30 minutes. At the same liquor temperature, two 1.5 ml/l lots of aqueous sodium hydroxide solution (50%) are added 10 minutes apart, the package is further treated at that temperature for 20 minutes before the liquor is cooled back down to 40° C. and the packages are rinsed twice with water.

The glass yarn thus pretreated is then dyed as follows:

In the dyeing machine described and at a liquor ratio of 13:1, the packages are prewetted for 10 minutes at room temperature in an aqueous liquor which contains 1 g/l of a mixture of tallow fatty amine/ethylene oxide adducts which have been esterified with sulfuric acid or quaternized with dimethyl sulfate. 0.3 ml/l of aqueous sodium hydroxide solution (50%) is then added to the liquor, followed after a further 10 minutes by a dye mixture comprising 0.30% of C.I. Acid Yellow 220, 0.15% of C.I. Acid Red 315 and 0.15% of C.I. Acid Blue 317.

After 10 minutes at room temperature the liquor is heated to 60° C. in the course of 45 minutes. The packages are then dyed at that temperature for 60 minutes. The final pH of the liquor is 10.3. After the liquor has been cooled back down to 40° C., the packages are rinsed and finished. To this end the packages are treated at 30° C. for 20 minutes in an acqueous liquor which contains 8.0 g/l of an emulsion of a self-crosslinking acrylate copolymer and 2.0 g/l of a polyethylene wax/-polydimethylsiloxane (1:1) emulsion. Thereafter the liquor is centrifuged off, and the packages are dried at 100° C. and then fixed at 130° C. for 60 seconds.

The glass yarn has a uniform brown shade which has good light, water and wash fastness properties.

Similar results are obtained on applying to glass fibers a finish from an aqueous liquor which contains 2.0 g/l of an emulsion of an aminoalkyl-substituted polysiloxane and 0.5 g of a nonionic surfactant (a p-tert-octylphenol-/ethylene oxide condensation product).

EXAMPLE 7

The glass yarn or glass fiber ribbon pretreated as described in Example 1 is padded at room temperature in an aqueous liquor which contains 30 g/l of a resin based on polyethylene and polyamine, 1 g/l of the condensation product of p-tert.-octylphenyl and 8 moles of ethyleneoxide and 10 g/l of a 4% solution of a graft polymer of glycerolpropylene oxide adduct and acrylamide and is squeezed off to a weight increase of 30%. Alternatively, the glass fiber ribbon can also be printed with a resin formulation (5 g/l).

Thereafter the glass fiber ribbon thus impregnated/printed is dried and fixed at 130° C. in the course of 4 minutes.

The glass fiber ribbon is dyed by impregnating it at room temperature in a liquor which contains 6 g of a dye mixture of C.I. Acid Yellow 220, C.I. Acid Red 315 and C.I. Acid Blue 317 (weight ratio 2:1:1), 1 g/l of a mixture of tallow fatty amine/ethylene oxide adducts which have been esterified with sulfuric acid or quaternized with dimethyl sulfate, and 10 g/l of a 4% solution of a graft polymer formed from a glycerol-propylene oxide adduct and acrylamide.

The impregnated glass fiber ribbon is squeezed off to a weight increase of 30% and then thermofixed at 130° C. for 4 minutes. Thereafter the glass fiber ribbon is rinsed with cold water and finished. To this end it is padded with an aqueous liquor containing 20 g/l of a dispersion of a self-crosslinking acrylate copolymer and 5 g/l of an emulsion of a modified polysiloxane, squeezed off to a weight increase of 30% and then dried and fixed at 130° C. for 4 minutes.

The result obtained is a brown glass fiber ribbon having good rub, wet and light fastness properties.

Instead of the dyeing of the glass fiber ribbon by impregnation in a dye liquor it may be printed with a corresponding printing paste.

What is claimed is:

1. A process for dyeing or printing sized or desized glass fibers which comprises
   (a) subjecting said fibers to an acid treatment up to a degree of extraction of at most 2% by weight,
   (b) optionally drying and/or storing the thus treated fibers, and
   (c) dyeing or printing said fibers with anionic dyes in the presence of cationic compounds selected from the group consisting of salts of primary, secondary or tertiary amines, and mono- or polyquaternized ammonium compounds.

2. A process according to claim 1, wherein the glass fibers are treated with the cationic compounds in a separate liquor before the actual dyeing process.

3. A process according to claim 2, wherein, following the acid treatment, the glass fibers are dried and stored and then treated with the cationic compounds in a separate liquor before the actual dyeing process.

4. A process according to claim 2, wherein, before the actual dyeing process, the glass fibers are treated simultaneously with an acid and the cationic compounds in a separate liquor and are then optionally dried and/or stored.

5. A process according to claim 1, wherein the glass fibers are dyed from dyeing liquors which in addition to the anionic dyes also contain the cationic compounds.

6. A process according to claim 5, wherein glass fibers are dyed which have been dried and/or stored after the acid treatment.

7. A process according to claim 1, wherein the glass fibers are treated with the cationic compounds in a separate liquor before printing.

8. A process according to claim 7, wherein, following the acid treatment, the glass fibers are dried and stored and then treated with the cationic compounds in a separate liquor before printing.

9. A process according to claim 7, wherein, before printing, the glass fibers are treated simultaneously with an acid and the cationic compounds in a separate liquor and are then optionally dried and/or stored.

10. A process according to claim 1, wherein the glass fibers are printed with printing pastes which in addition to the anionic dyes also contain the cationic compounds.

11. A process according to claim 10, wherein glass fibers are printed which have been dried and/or stored after the acid treatment.

12. A process according to claim 1, wherein the anionic dyes are direct, acid, metal complex or reactive.

13. A process according to claim 1, wherein the cationic compounds are quaternized piperidine or polypiperidine derivatives.

14. A process according to claim 1, wherein the dyeing is carried out in a liquor which contains the dye with or without the cationic compounds and customary assistants and is heated continuously from room temperature to temperatures of from 50° C. to just below the boiling point in the course of about 15 to 60 minutes, maintained at that temperature for about 30 to 120 minutes and then cooled back down to 15° to 50° C. in the course of about 15 to 60 minutes.

15. A process according to claim 14, wherein the dyeing is carried out in a liquor which is heated continuously from room temperature to 60°-80° C. in the course of about 20 to 40 minutes, maintained at that temperature for about 45 to 90 minutes and then cooled back down to about 25° to 50° C. in the course of about 15 to 30 minutes.

16. A process according to claim 1, wherein a liquor ratio of about 4:1 to 15:1 is maintained during the dyeing.

17. A process according to of claim 1, wherein the glass fibers are padded with a liquor which contains the dye, with or without the cationic compounds, and customary assistants and the dye is then fixed on the fibers by cold storage, steaming or thermofixing.

18. A process according to claim 1, wherein the dyed glass fibers are aftertreated in a conventional manner with crosslinkable or polymerizable polymers or prepolymers which are capable of forming a coating on the fiber.

19. A process according to claim 18, wherein a water vapour-tight coating is formed on the dyed or printed glass fibers and a permanent residual water content of 2 to 5% remains in the fibers.

20. A process according to claim 1, wherein the glass fibers are textile glass fibers which are present as loose fibers, yarns, woven fabrics, knitted fabrics or nonwoven fabrics.

21. Glass fibers, dyed or printed by the process according to claim 1.

22. Sized or desized and acid treated glass fibers for carrying out the process according to claim 1, which have been pretreated with a cationic compound selected from the group consisting of salts of primary, secondary or tertiary amines, and mono- or polyquaternized ammonium compounds.

* * * * *